US009787552B2

(12) United States Patent
Sawada et al.

(10) Patent No.: US 9,787,552 B2
(45) Date of Patent: Oct. 10, 2017

(54) OPERATION PROCESS CREATION PROGRAM, OPERATION PROCESS CREATION METHOD, AND INFORMATION PROCESSING DEVICE

(71) Applicant: FUJITSU LIMITED, Kawasaki-shi, Kanagawa (JP)

(72) Inventors: Hisashi Sawada, Kobe (JP); Michio Masuno, Yokohama (JP); Takeya Mutoh, Akashi (JP); Yuko Matsushita, Himeji (JP); Nobuko Takase, Mizuho (JP); Tomoko Tanaka, Nagoya (JP); Toshiyuki Utsumi, Kobe (JP); Navid Afzal Shooshtary, Ashiya (JP); Yutaka Arakawa, Kobe (JP); Hiroyoshi Okada, Ibaraki (JP); Yoshio Oki, Kobe (JP); Hisashi Tsujide, Takarazuka (JP); Hiroshi Nakanishi, Osaka (JP); Kazuyuki Sakai, Nissin (JP)

(73) Assignee: FUJITSU LIMITED, Kawasaki (JP)

( * ) Notice: Subject to any disclaimer, the term of this patent is extended or adjusted under 35 U.S.C. 154(b) by 394 days.

(21) Appl. No.: 14/551,370

(22) Filed: Nov. 24, 2014

(65) Prior Publication Data
US 2015/0081874 A1    Mar. 19, 2015

Related U.S. Application Data

(63) Continuation of application No. PCT/JP2012/064224, filed on May 31, 2012.

(51) Int. Cl.
*G06F 15/173* (2006.01)
*H04L 12/24* (2006.01)
(Continued)

(52) U.S. Cl.
CPC .............. *H04L 41/50* (2013.01); *G06F 3/048* (2013.01); *G06F 9/4443* (2013.01); *H04L 41/00* (2013.01)

(58) Field of Classification Search
CPC ..... H04L 12/24; H04L 41/0893; G06F 3/048; G06F 9/4443; H04Q 2213/13053
(Continued)

(56) References Cited

U.S. PATENT DOCUMENTS

2001/0052013 A1\* 12/2001 Munguia ............. G06F 11/0709
709/225
2003/0107599 A1    6/2003 Fuller et al.
(Continued)

FOREIGN PATENT DOCUMENTS

JP    2-140817    5/1990
JP    7-182128    7/1995
(Continued)

OTHER PUBLICATIONS

Patent Abstracts of Japan, Publication No. 02-140817, Published May 30, 1990.
(Continued)

*Primary Examiner* — Wing F Chan
*Assistant Examiner* — Andrew Woo
(74) *Attorney, Agent, or Firm* — Staas & Halsey LLP

(57) ABSTRACT

A non-transitory computer-readable recording medium stores an operation process creation program that causes a computer to execute a process, the process including extracting a candidate operation manipulation component to be combined with an operation process following an operation manipulation component that has been determined to be arranged, when creating the operation process by arranging a plurality of the operation manipulation components on a screen, the candidate being extracted based on previously set
(Continued)

relevance information indicating relevance between operation manipulation components and usage frequency information indicating usage frequencies of operation manipulation components in past instances of creating the operation processes; and displaying the extracted candidate operation manipulation component on the screen, by combining the extracted candidate operation manipulation component with the operation manipulation component that has been determined to be arranged.

9 Claims, 19 Drawing Sheets

(51) Int. Cl.
   *G06F 3/048* (2013.01)
   *G06F 9/44* (2006.01)
(58) Field of Classification Search
   USPC .......................................................... 709/223
   See application file for complete search history.

(56) References Cited

U.S. PATENT DOCUMENTS

| | | | |
|---|---|---|---|
| 2005/0053027 | A1 | 3/2005 | Lampin et al. |
| 2007/0044009 | A1 | 2/2007 | Tokunaga |
| 2008/0034128 | A1 | 2/2008 | Evans |
| 2009/0150541 | A1* | 6/2009 | Georgis ............... G06F 9/4443 709/224 |
| 2009/0217168 | A1 | 8/2009 | Dexter et al. |
| 2010/0011024 | A1 | 1/2010 | Suzuki et al. |
| 2011/0125667 | A1 | 5/2011 | Faludi et al. |
| 2011/0202887 | A1* | 8/2011 | Mendez ................... G06F 8/34 715/853 |
| 2011/0225155 | A1 | 9/2011 | Roulland et al. |

FOREIGN PATENT DOCUMENTS

| | | |
|---|---|---|
| JP | 9-251305 | 9/1997 |
| JP | 11-259547 | 9/1999 |
| JP | 2004-54854 | 2/2004 |
| JP | 2006-221293 | 8/2006 |
| JP | 2007-47862 | 2/2007 |
| JP | 2007-65724 | 3/2007 |
| JP | 2007-516480 | 6/2007 |
| JP | 2010-20133 | 1/2010 |
| JP | 2010-231526 | 10/2010 |
| JP | 2011-176753 | 9/2011 |
| WO | WO 2005/003967 A1 | 1/2005 |

OTHER PUBLICATIONS

Patent Abstracts of Japan, Publication No. 07-182128, published Jul. 21, 1995.
Patent Abstracts of Japan, Publication No. 11-259547, published Sep. 24, 1999.
Patent Abstracts of Japan, Publication No. 2004-054854, published Feb. 19, 2004.
Patent Abstracts of Japan, Publication No. 2006-221293, published Aug. 24, 2006.
Patent Abstracts of Japan, Publication No. 2007-047862, published Feb. 22, 2007.
Patent Abstracts of Japan, Publication No. 2007-065724, published Mar. 15, 2007.
Patent Abstracts of Japan, Publication No. 2010-020133, published Jan. 28, 2010.
Patent Abstracts of Japan, Publication No. 2010-231526, published Oct. 14, 2010.
Patent Abstracts of Japan, Publication No. 2011-176753, published Sep. 8, 2011.
International Search Report mailed Aug. 21, 2012, in International Patent Application No. PCT/JP2012/064223 of co-pending U.S. Appl. No. 14/551,380.
International Search Report mailed Aug. 28, 2012, in corresponding International Patent Application No. PCT/JP2012/064224.
U.S. Appl. No. 14/551,380, filed Nov. 24, 2014, Sakai et al., Fujitsu Limited.
Patent Abstracts of Japan, Publication No. 9-251305, published Sep. 22, 1997.
Japanese Office Action dated Feb. 23, 2016 in corresponding Japanese Patent Application No. 2014-518193.
Japanese Office Action dated Nov. 17, 2015 in Japanese Patent Application No. 2014-518192.
Office Action for U.S. Appl. No. 14/551,380 dated Mar. 16, 2017.
Office Action for U.S. Appl. No. 14/551,380 dated Aug. 11, 2017.

* cited by examiner

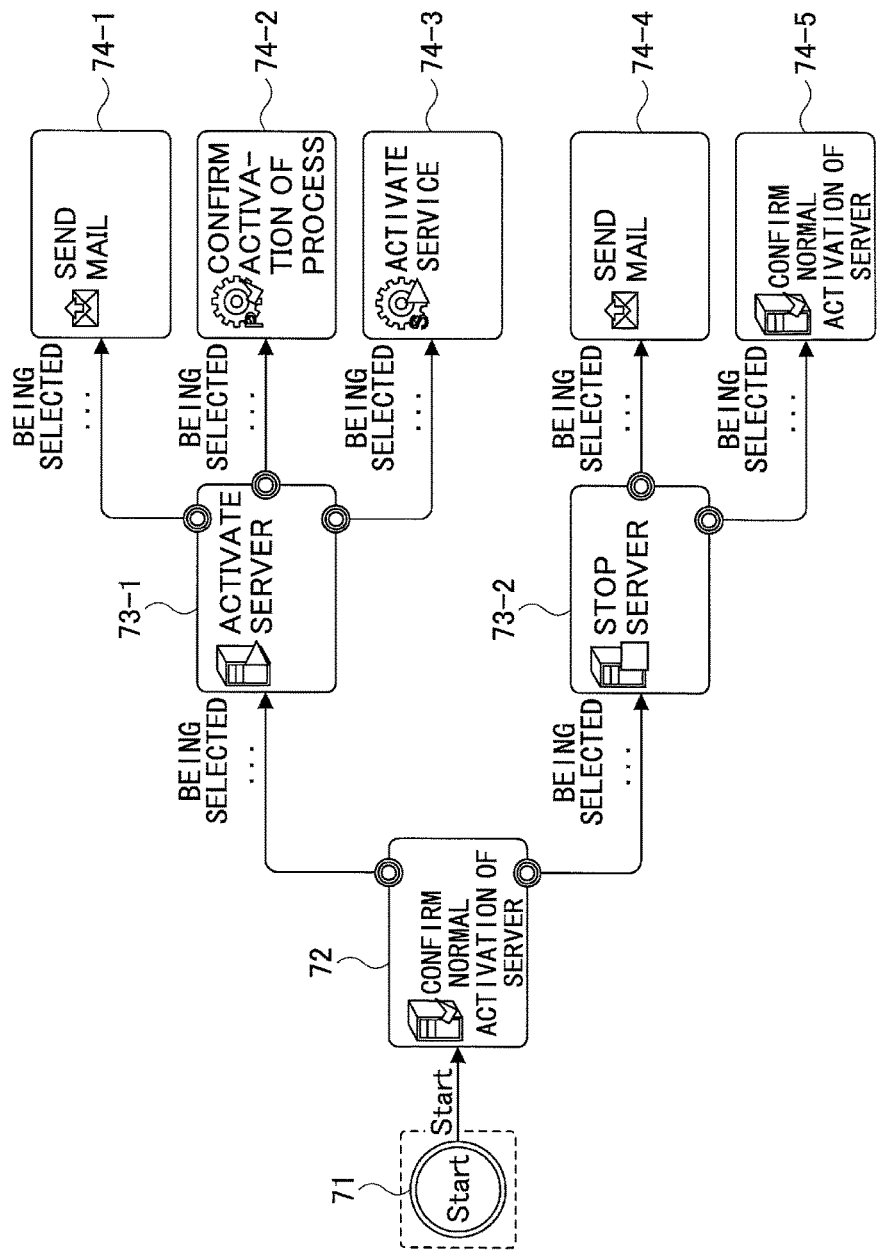

FIG. 11

| Element Name | Parent Element | Element Description | Component Name | Component Type | Component Description | Data Type |
|---|---|---|---|---|---|---|
| Operation Components | — | OPERATION MANIPULATION COMPONENT | id | Attribute | UNIQUE IDENTIFIER | ID |
| | | | name | Attribute | OPERATION MANIPULATION COMPONENT | string |
| | | | status | Attribute | TUNING STATE | string |
| | | | Server Operation | Element | SERVER MANIPULATION COMPONENT | — |
| | | | Command Operation | Element | COMMAND EXECUTION COMPONENT | — |
| | | | File Operation | Element | FILE MANIPULATION COMPONENT | — |
| | | | Mail Operation | Element | MAIL MANIPULATION COMPONENT | — |
| | | | … | Element | … | — |
| Server Operation | Operation Components | SERVER MANIPULATION COMPONENT | Start Server | Attribute | ACTIVATE SERVER | string |
| | | | Start Server Relation | Element | OPERATION MANIPULATION COMPONENT RELEVANT TO [ACTIVATE SERVER] | — |
| | | | Stop Server | Attribute | STOP SERVER | string |
| | | | Stop Server Relation | Element | OPERATION MANIPULATION COMPONENT RELEVANT TO [STOP SERVER] | — |
| | | | … | Attribute | … | string |
| | | | …Relation | Element | OPERATION MANIPULATION COMPONENT RELEVANT TO [...] | — |
| Command Operation | Operation Components | COMMAND EXECUTION COMPONENT | Execute Command | Attribute | EXECUTE ARBITRARY COMMAND | string |
| | | | Execute Command Relation | Element | OPERATION MANIPULATION COMPONENT RELEVANT TO [EXECUTE ARBITRARY COMMAND] | — |
| | | | Execute Commands | Attribute | EXECUTE A PLURALITY OF COMMANDS | string |
| | | | Execute Commands Relation | Element | OPERATION MANIPULATION COMPONENT RELEVANT TO [EXECUTE A PLURALITY OF COMMANDS] | — |
| | | | … | Attribute | … | string |
| | | | …Relation | Element | OPERATION MANIPULATION COMPONENT RELEVANT TO [...] | — |

FIG.12

| Element Name | Parent Element | Element Description | Component Name | Component Type | Component Description | Data Type |
|---|---|---|---|---|---|---|
| Start Server Relation | Server Operation | OPERATION MANIPULATION COMPONENT RELEVANT TO [ACTIVATE SERVER] | Relation Operation1 | Attribute | RELEVANT OPERATION MANIPULATION COMPONENT 1 | string |
| | | | Relation Operation2 | Attribute | RELEVANT OPERATION MANIPULATION COMPONENT 2 | string |
| | | | Relation Operation3 | Attribute | RELEVANT OPERATION MANIPULATION COMPONENT 3 | string |
| | | | ... | Attribute | RELEVANT OPERATION MANIPULATION COMPONENT ... | string |
| Stop Server Relation | Server Operation | OPERATION MANIPULATION COMPONENT RELEVANT TO [STOP SERVER] | Relation Operation1 | Attribute | RELEVANT OPERATION MANIPULATION COMPONENT 1 | string |
| | | | Relation Operation2 | Attribute | RELEVANT OPERATION MANIPULATION COMPONENT 2 | string |
| | | | Relation Operation3 | Attribute | RELEVANT OPERATION MANIPULATION COMPONENT 3 | string |
| | | | ... | Attribute | RELEVANT OPERATION MANIPULATION COMPONENT ... | string |
| Execute Command Relation | Command Operation | OPERATION MANIPULATION COMPONENT RELEVANT TO [EXECUTE ARBITRARY COMMAND] | Relation Operation1 | Attribute | RELEVANT OPERATION MANIPULATION COMPONENT 1 | string |
| | | | Relation Operation2 | Attribute | RELEVANT OPERATION MANIPULATION COMPONENT 2 | string |
| | | | Relation Operation3 | Attribute | RELEVANT OPERATION MANIPULATION COMPONENT 3 | string |
| | | | ... | Attribute | RELEVANT OPERATION MANIPULATION COMPONENT ... | string |
| Execute Commands Relation | Command Operation | OPERATION MANIPULATION COMPONENT RELEVANT TO [EXECUTE A PLURALITY OF COMMANDS] | Relation Operation1 | Attribute | RELEVANT OPERATION MANIPULATION COMPONENT 1 | string |
| | | | Relation Operation2 | Attribute | RELEVANT OPERATION MANIPULATION COMPONENT 2 | string |
| | | | Relation Operation3 | Attribute | RELEVANT OPERATION MANIPULATION COMPONENT 3 | string |
| | | | ... | Attribute | RELEVANT OPERATION MANIPULATION COMPONENT ... | string |
| ... | ... | ... | ... | ... | ... | |

FIG.13

```
(01) <?xml version="1.0" encoding="UTF-8"?>
(02) <entities>
(03) <item type="OperationCompornents" id="0001" name="OperationCompornents" status="observed">
(04)   <ServerOperation>
(05)     <OperationCompornents>
(06)       <CheckServer CheckServerRelation="StartServer,StopServer,SendMail"/>
(07)       <StartServer StartServerRelation="StartVM,StartWorkUnit,SendMail"/>
(08)       <StopServer StopServerRelation="CheckServer,SendMail"/>
(09)     </OperationCompornents>
(10)   </ServerOperation>
(11)   <CommandOperation>
(12)     <OperationCompornents>
(13)       <ExecuteCommand ExecuteCommandRelation="StartJob,StartWorkUnitSendMail"/>
(14)       <ExecuteCommands ExecuteCommandsRelation="StartJob,StartWorkUnit,SendMail"/>
(15)     </OperationCompornents>
(16)   </CommandOperation>
(17) </item>
(18) </entities>
```

FIG.14

| Element Name | Parent Element | Element Description | Component Name | Component Type | Component Description | Data Type |
|---|---|---|---|---|---|---|
| | | | id | Attribute | UNIQUE IDENTIFIER | ID |
| Definition Components | | DEFINITION INFORMATION | name | Attribute | OPERATION MANIPULATION COMPONENT | string |
| | | | status | Attribute | TUNING STATE | string |
| | | | Server Operation | Element | SERVER MANIPULATION COMPONENT | - |
| | | | Command Operation | Element | COMMAND EXECUTION COMPONENT | - |
| | | | File Operation | Element | FILE MANIPULATION COMPONENT | - |
| | | | Mail Operation | Element | MAIL MANIPULATION COMPONENT | - |
| | | | ... | Element | ... | - |
| Server Operation | Operation Components | SERVER MANIPULATION COMPONENT | Start Server Definition | Element | DETAILED DEFINITION OF [ACTIVATE SERVER] | - |
| | | | Stop Server Definition | Element | DETAILED DEFINITION OF [STOP SERVER] | - |
| | | | ... Definition | Element | DETAILED DEFINITION OF [...] | - |
| Command Operation | Operation Components | COMMAND EXECUTION COMPONENT | Execute Command Definition | Element | DETAILED DEFINITION OF [EXECUTE ARBITRARY COMMAND] | - |
| | | | Execute Commands Definition | Element | DETAILED DEFINITION OF [EXECUTE A PLURALITY OF COMMANDS] | - |
| | | | ... Definition | Element | DETAILED DEFINITION OF [...] | - |
| Start Server Definition | Server Operation | DETAILED DEFINITION OF [ACTIVATE SERVER] | Setting Date | Attribute | LAST SETTING DATE | date |
| | | | hostname | Attribute | HOST NAME | string |
| | | | service | Attribute | SERVICE NAME | string |
| | | | port | Attribute | PORT NUMBER | string |
| | | | ostype | Attribute | OS TYPE | string |
| | | | username | Attribute | USER ID | string |
| | | | password | Attribute | PASSWORD | string |
| | | | ... | Attribute | ... | string |

FIG.15

| Element Name | Parent Element | Element Description | Component Name | Component Type | Component Description | Data Type |
|---|---|---|---|---|---|---|
| Stop Server Definition | Server Operation | DETAILED DEFINITION OF [STOP SERVER] | Setting Date | Attribute | LAST SETTING DATE | date |
| | | | hostname | Attribute | HOST NAME | string |
| | | | ostype | Attribute | OS TYPE | string |
| | | | username | Attribute | USER ID | string |
| | | | password | Attribute | PASSWORD | string |
| | | | ... | Attribute | ... | |
| Execute Command Definition | Command Operation | DETAILED DEFINITION OF [EXECUTE ARBITRARY COMMAND] | Setting Date | Attribute | LAST SETTING DATE | date |
| | | | hostname | Attribute | HOST NAME | string |
| | | | commandline | Attribute | COMMAND LINE | string |
| | | | username | Attribute | USER ID | string |
| | | | password | Attribute | PASSWORD | string |
| | | | ... | Attribute | ... | |
| Execute Commands Definition | Command Operation | OPERATION MANIPULATION COMPONENT RELEVANT TO [EXECUTE A PLURALITY OF COMMANDS] | Setting Date | Attribute | LAST SETTING DATE | date |
| | | | hostname | Attribute | HOST NAME | string |
| | | | commandlinelist | Attribute | COMMAND LINE LIST | string |
| | | | username | Attribute | USER ID | string |
| | | | password | Attribute | PASSWORD | string |
| | | | ... | Attribute | ... | |
| ... | | | ... | ... | | |

FIG. 16A

```
(01) <?xml version="1.0" encoding="UTF-8"?>
(02) <entities>
(03) <item type="DefinitionCompornents" id="00001" name="DefinitionCompornents" status="observed">
(04)   <OperationCompornents>
(05)     <ServerOperation>
(06)       <CheckServerDefinition SettingDate="2012/03/05 12:36:45" hostname="localhost" service=
(07) "service" port="9999" ostype="Windows (REGISTERED TRADEMARK)" username="Administrator" password="****"/>
(08)     </ServerOperation>
(09)   </OperationCompornents>
(10) </item>
(11) </entities>
```

FIG. 16B

```
(01) <?xml version="1.0" encoding="UTF-8"?>
(02) <entities>
(03) <item type="DefinitionCompornents" id="00001" name="DefinitionCompornents" status="observed">
(04)   <OperationCompornents>
(05)     <ServerOperation>
(06)       <StartServerDefinition SettingDate="2012/03/25 10:25:35" hostname="localhost"
(07) service="service" port="9999" ostype="Windows" username="Administrator" password="****"/>
(08)     </ServerOperation>
(09)   </OperationCompornents>
(10) </item>
(11) </entities>
```

FIG.17

```
(01) <?xml version="1.0" encoding="UTF-8"?>
(02) <entities>
(03)   <item type="DefinitionCompornents" id="00001" name="DefinitionCompornents" status="observed">
(04)     <ServerOperation>
(05)       <OperationCompornents>
(06)         <CheckServerDefinition SettingDate="2012/03/05 12:36:45" hostname="localhost"
(07) service="service" port="9999" ostype="Windows" username="Administrator" password="****" />
(08)       </OperationCompornents>
(09)     </ServerOperation>
(10)   </item>
(11) </entities>
(12) <?xml version="1.0" encoding="UTF-8"?>
(13) <entities>
(14)   <item type="DefinitionCompornents" id="00001" name="DefinitionCompornents" status="observed">
(15)     <ServerOperation>
(16)       <OperationCompornents>
(17)         <StartServerDefinition SettingDate="2012/03/25 10:25:35" hostname="localhost"
(18) service="service" port="9999" ostype="Windows" username="Administrator" password="****" />
(19)       </OperationCompornents>
(20)     </ServerOperation>
(21)   </item>
(22) </entities>
```

FIG.18

```
(23) <?xml version="1.0" encoding="UTF-8"?>
(24) <entities>
(25) <item type="DefinitionCompornents" id="00001" name="DefinitionCompornents" status="observed">
(26)   <ServerOperation>
(27)     <OperationCompornents>
(28)       <StartServerDefinition SettingDate="2012/03/26 15:45:25" hostname="localhost"
(29) service=" service" port="9999" ostype="Windows" username="Administrator" password="****" />
(30)     </OperationCompornents>
(31)   </ServerOperation>
(32) </item>
(33) </entities>
(34) <?xml version="1.0" encoding="UTF-8"?>
(35) <entities>
(36) <item type="DefinitionCompornents" id="00002" name="DefinitionCompornents" status="observed">
(37)   <MailOperation>
(38)     <OperationCompornents>
(39)       <SendMailDefinition SettingDate="2012/02/27 10:05:54" hostname="localhost"
(40) fromaddress=" user@sample.com" toaddress=" user1@samile.com" subject="Subject" text="Test" />
(41)     </OperationCompornents>
(42)   </MailOperation>
(43) </item>
(44) </entities>
```

FIG.19

```
(45) <?xml version="1.0" encoding="UTF-8"?>
(46) <entities>
(47) <item type="DefinitionCompornents" id="00002" name="DefinitionCompornents" status="observed">
(48)   <MailOperation>
(49)     <OperationCompornents>
(50)       <SendMailDefinition SettingDate="2012/03/11 14:35:14" hostname="localhost"
(51)        fromaddress="user@sample.com" toaddress="user1@samile.com" subject="Sublect" text="Test"/>
(52)     </OperationCompornents>
(53)   </MailOperation>
(54) </item>
(55) </entities>

(56) <?xml version="1.0" encoding="UTF-8"?>
(57) <entities>
(58) <item type="DefinitionCompornents" id="00002" name="DefinitionCompornents" status="observed">
(59)   <MailOperation>
(60)     <OperationCompornents>
(61)       <SendMailDefinition SettingDate="2012/03/27 09:32:02" hostname="localhost"
(62)        fromaddress="user@sample.com" toaddress="user1@samile.com" subject="Sublect" text="Test"/>
(63)     </OperationCompornents>
(64)   </MailOperation>
(65) </item>
(66) </entities>
```

OPERATION PROCESS CREATION PROGRAM, OPERATION PROCESS CREATION METHOD, AND INFORMATION PROCESSING DEVICE

CROSS-REFERENCE TO RELATED APPLICATION

This application is a U.S. continuation application filed under 35 USC 111(a) claiming benefit under 35 USC 120 and 365(c) of PCT Application PCT/JP2012/064224 filed on May 31, 2012, the entire contents of which are incorporated herein by reference.

FIELD

The embodiments discussed herein are related to an operation process creation program, an operation process creation method, and an information processing device.

BACKGROUND

Conventionally, in an Information and Communication Technology (ICT) division in a company, servers are increasingly being aggregated into a data center in the company, for the purpose of improving cost competitiveness, for example. By server aggregation, the costs of procuring hardware and software and the costs of facilities and installation locations have been reduced. However, the operation management cost of the ICT system that is becoming more complex, is increasing. Therefore, conventionally, needs have been increasing for automating many kinds of operation work that have been done by human beings according to an operating procedures manual, in order to implement operation work of a large-scale, diversified system.

Thus, conventionally, there has been a method of creating an operation process (operation flow) needed of automating the operation work beforehand, and operating various manipulation target servers at the data center according to the created operation process. When creating an operation process, for example, an operation manipulation component matching the operation purpose is selected from several hundreds of operation manipulation components that are set in advance with the use of, for example, an exclusive-use tool, and the selected operation manipulation component is arranged on a screen according to operating procedures. An operation manipulation component means various components for manipulating the activation of a server and the intervention of personnel at the time of operation. Note that the operation manipulation components described above need to be manually defined. Furthermore, when creating an operation process, each of the selected operation manipulation components are manually arranged on the screen, and furthermore, the arranged operation manipulation components are combined according to operating procedures.

Note that conventionally, there is a method of extracting a component from a plurality of components based on a selected attribute of a design architecture and a component arrangement position, and displaying the selection candidates in an ascending order of the probability of being executed, with the component of the highest probability appearing at the top (see, for example, Patent Documents 1 and 2).

Patent Document 1: Japanese Laid-Open Patent Publication No. H11-259547

Patent Document 2: Japanese Laid-Open Patent Publication No. H7-182128

However, when creating an operation process as described above, an appropriate operation manipulation component needs to be extracted from multiple operation manipulation components. Furthermore, as in the conventional method, when the candidates of operation manipulation components are selected in advance, there is a need to set detailed definitions in advance for the respective operation manipulation components. Therefore, in the conventional technology, the user involved in the operation management work (operation process creator) is subjected to cumbersome tasks for manually setting the definitions, and extensive labor and time are spent for inputting the definitions.

Furthermore, for example, when candidates of components are only arranged in a menu, the user needs to manually perform the manipulation of selecting a component from the menu, arranging the component in a screen, and combining the components. Therefore, the manipulation amount has not been efficiently reduced, and the cost of creating an operation process has not been significantly reduced.

SUMMARY

According to an aspect of the embodiments, a non-transitory computer-readable recording medium stores an operation process creation program that causes a computer to execute a process, the process including extracting a candidate operation manipulation component to be combined with an operation process following an operation manipulation component that has been determined to be arranged, when creating the operation process by arranging a plurality of the operation manipulation components on a screen, the candidate being extracted based on previously set relevance information indicating relevance between operation manipulation components and usage frequency information indicating usage frequencies of operation manipulation components in past instances of creating the operation processes; and displaying the extracted candidate operation manipulation component on the screen, by combining the extracted candidate operation manipulation component with the operation manipulation component that has been determined to be arranged.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 8 illustrates a display example of candidates of a plurality of places ahead;

FIG. 11 illustrates examples of items in relevance information according to an embodiment (part 1);

FIG. 12 illustrates examples of items in relevance information according to an embodiment (part 2);

FIG. 13 illustrates a data example of relevance information according to an embodiment;

FIG. 14 illustrates an example of items in logging information according to an embodiment (part 1);

FIG. 15 illustrates an example of items in logging information according to an embodiment (part 2);

FIGS. 16A and 16B illustrate specific examples of logging information according to an embodiment;

FIG. 17 illustrates an example of logging information to which priority levels are applied (part 1);

FIG. 18 illustrates an example of logging information to which priority levels are applied (part 2); and FIG. 19 illustrates an example of logging information to which priority levels are applied (part 3).

DESCRIPTION OF EMBODIMENTS

Figure 1:
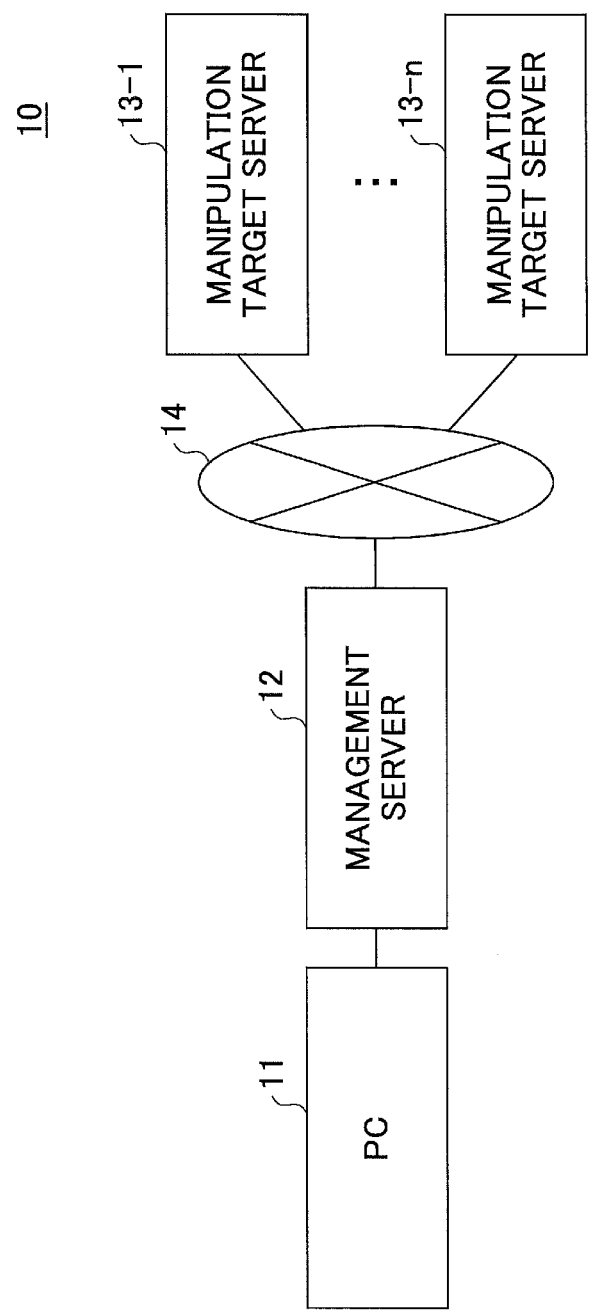
FIG. 1 illustrates an example of an operation system according to an embodiment.

Preferred embodiments of the present invention will be explained with reference to accompanying drawings.
Example of Operation System FIG. 1 illustrates an example of an operation system according to an embodiment. An operation system 10 illustrated in FIG. 1 includes a personal computer (PC) 11 as an example of an information processing device, a management server 12, and one or more manipulation target servers 13-1 through 13-n (hereinafter, collectively referred to as a "manipulation target server 13" according to need). Note that in the example of the operation system 10 illustrated in FIG. 1, the management server 12 and the manipulation target server 13 are connected by a communication network 14 represented by a Local Area Network (LAN) or the Internet. Note that the present embodiment is not limited to this configuration; the PC 11 and the management server 12 may be connected via the communication network 14.

For example, the operation system 10 illustrated in FIG. 1 realizes the automation of operation work relevant to respective businesses with respect to the manipulation target servers 13 that are aggregated in the data center, based on an operation process (operation flow) created according to the present embodiment.

In FIG. 1, the PC 11 is a development environment for creating an operation process according to the present embodiment. For example, the user (operation process creator) registers an operation process created at the PC 11 in the management server 12, to automate the operation work using the manipulation target server 13.

The management server 12 executes an operation process that automates operation work and manages the execution results. The management server 12 also manages, as configuration information, the information (for example, a host name, an IP address, and a password) of the manipulation target server 13, which is an example of a manipulation target that is caused to execute the operation process. The management server 12 cause each manipulation target server 13 to execute an operation process, based on the configuration information described above. Furthermore, the management server 12 confirms the execution status by the system administrator, and outputs a screen for implementing manipulations such as activating and stopping an operation process.

The manipulation target server 13 executes an operation process as instructed by the management server 12. Note that the manipulation target server 13 may be, for example, various devices such as a business server. The transmission and reception of data between the manipulation target server 13 and the management server 12 is performed by communication such as Secure Shell (SSH), HyperText Transfer Protocol (HTTP), and Hypertext Transfer Protocol over Secure Socket Layer (HTTPS).

Figure 2:
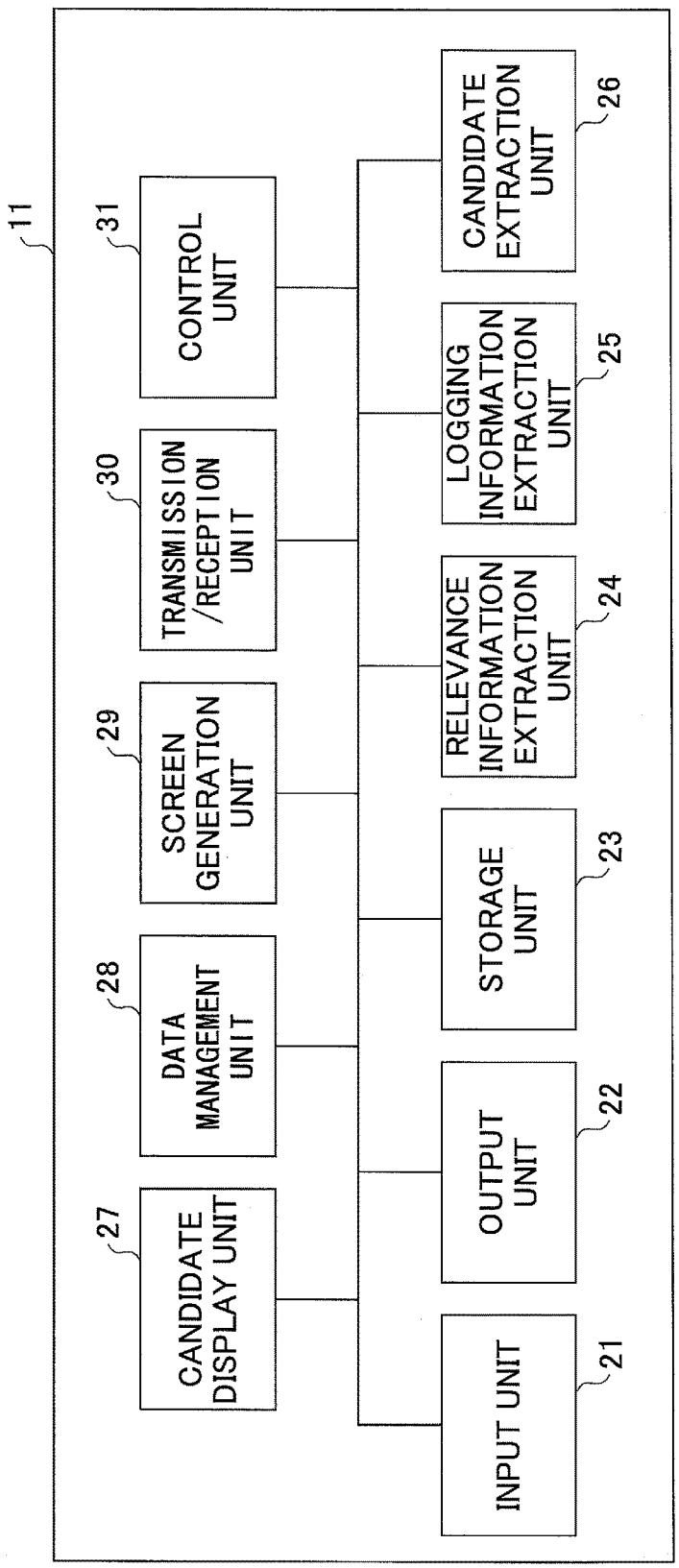
FIG. 2 illustrates an example of a functional configuration of a PC.

Note that in the operation system 10 described above, a plurality of PCs 11 may be connected to the management server 12, and accordingly, a plurality of users (operation process creators) are able to manage, with the management server 12, the contents of the operation processes that have been created by the respective users. Furthermore, in the operation system 10 described above, the PC 11 and the management server 12 are separate bodies; however, the present embodiment is not so limited. The PC 11 and the management server 12 may be integrated as a single body. Therefore, an example of an information processing device may be the PC 11 or may be the management server 12. Furthermore, an information processing device according to the present embodiment is not limited to the PC 11; for example, the information processing device may be a mobile communication terminal such as a smartphone and a tablet terminal.
PC 11: Functional Configuration Example Next, a description is given of an example of a functional configuration of the PC 11 with reference to FIG. 2. FIG. 2 illustrates an example of a functional configuration of the PC 11. The PC 11 illustrated in FIG. 2 includes an input unit 21, an output unit 22, a storage unit 23, a relevance information extraction unit 24, a logging information extraction unit 25, a candidate extraction unit 26, a candidate display unit 27, a data management unit 28, a screen generation unit 29, a transmission/reception unit 30, and a control unit 31.

The input unit 21 receives input of the start and end of various instructions and various settings, relevant to an operation process creation process from a user using the PC 11. Note that the input unit 21 includes, for example, a keyboard and a mouse. Furthermore, the input unit 21 may receive input of sound, in which case the input unit 21 includes a sound input unit such as a microphone.

The output unit 22 outputs contents input by the input unit 21 and contents executed based on input contents. Note that the output unit 22 includes, for example, a display unit such as a display if the contents are output by displaying a screen, and includes a sound output unit such as a speaker if the contents are output by sound.

The storage unit 23 stores various kinds of information needed in the present embodiment. Specifically, the storage unit 23 stores relevance information relevant to an operation manipulation component set in advance, logging information of the time when a past operation process has been created, various operation manipulation components, definition information, and various kinds of setting information for executing the present embodiment.

Furthermore, with respect to the storage unit 23, the stored information may be read at predetermined timings according to need, and execution results relevant to an operation process creation process may be written. Note that the storage unit 23 is an aggregation of various kinds of information as described above, and may have a function as a database in which the information is systematically constituted such that the information may be searched for and extracted by using a keyword. Furthermore, the information stored in the storage unit 23 may be stored in, for example, the management server 12, and the management server 12 may be accessed according to need to acquire the information. Furthermore, in the present embodiment, new data such as an operation manipulation component and relevance information may be acquired from the management server 12 and stored in the storage unit 23.

The relevance information extraction unit 24 extracts relevance information indicating the relevance between the operation manipulation components. Note that the relevance indicates, for example, in a case where an operation manipulation component for confirming the "activation state of server" is arranged, the subsequent operation manipulation component has a high relevance in terms of the operation, such as "activate server", "stop server", and "send mail". That is to say, in the present embodiment, for example, relevance information indicating the relevance of an operation manipulation component is used for extracting the next operation process candidate, with respect to an operation manipulation component at the end of an operation process that is presently being created. As the relationship of the relevance, for example, information indicating the relevance between operation manipulation components is defined in advance and stored in the storage unit 23.

Furthermore, in the present embodiment, a plurality of relevance information items may be included according to the contents of the operation process. In this case, for example, the relevance information extraction unit 24 may extract a plurality of all relevance information items stored in the storage unit 23, or may extract one or more relevance information items corresponding to the operation process presently being created.

The logging information extraction unit 25 extracts, from information of operation manipulation components used in creating operation processes in the past, logging information of an operation process created in the past that is the same as or relevant to the operation process presently being created by the user (operation process creator). Note that logging information is, for example, data having order in time series, and includes the data log, manipulation log, user information, time information, and system information used when creating an operation process; however, the present embodiment is not so limited. Furthermore, logging information includes the usage frequency information of the operation manipulation component when an operation process has been created in the past.

Furthermore, in the present embodiment, a plurality of logging information items may be included for each content of an operation process and for each user. In this case, for example, the logging information extraction unit 25 may extract a plurality of all logging information items stored in the storage unit 23, or may extract one or more logging information items corresponding to the operation process presently being created.

The candidate extraction unit 26 performs filtering on the operation manipulation components based on the relevance information obtained from the relevance information extraction unit 24 and the logging information obtained from the logging information extraction unit 25, and extracts, for example, at least one candidate of the operation manipulation component.

The candidate display unit 27 displays the candidate of the operation manipulation component obtained by the candidate extraction unit 26, on a screen by such as the output unit 22. Specifically, the candidate display unit 27 provisionally displays, on a screen, at least one candidate of the operation manipulation component that is to be combined next, after the operation manipulation component at the end that is already set in the screen.

At this time, the candidate display unit 27 provisionally displays a predetermined number of operation manipulation components in a predetermined order, based on the priority level set for each operation manipulation component in advance. Furthermore, the candidate display unit 27 displays the candidate of the operation manipulation component provisionally displayed, by combining this candidate with the end of the operation manipulation components that have already been definitively arranged.

Note that the candidate display unit 27 may display the operation manipulation component candidates in a different manner from the operation manipulation components that have already been set, in order to express to the user that candidates of operation manipulation components are displayed on the screen. Displaying in a different manner means, for example, changing the color or pattern of the candidates of operation manipulation component from those of the operation manipulation components that have already been determined to be arranged, or displaying the candidates of the operation manipulation components in an emphasized manner such as blinking the candidates of the operation manipulation components.

Furthermore, the candidate display unit 27 may collectively display candidates of operation manipulation components of a plurality of places ahead, or display an operation manipulation component that has been newly added in a manner that is easily recognized by the user, or display a plurality of routes branching from a single operation manipulation component.

When a user selects one candidate from a plurality of candidates of an operation manipulation component that are provisionally displayed on a screen by the candidate display unit 27, the data management unit 28 stores the result of the selection in the storage unit 23 as logging information. The data management unit 28 manages the combination relationship between the operation manipulation components when creating the operation process. Furthermore, for example, when a new operation manipulation component is added from an external device such as the management server 12, the data management unit 28 registers the component in the storage unit 23. Furthermore, the data management unit 28 manages the priority level relevant to candidate extraction, such as increasing the priority level for an operation manipulation component of a high usage frequency or a newly added operation manipulation component.

The screen generation unit 29 generates a development environment screen for creating an operation process according to the present embodiment. Specifically, the screen generation unit 29 generates a setting screen relevant to creating an operation process, an editor screen for creating an operation process, and a screen for displaying the contents of the operation process that has been created. Furthermore, the screen generation unit 29 may generate a screen for displaying a plurality of operation manipulation components in a predetermined area in a palette, for example. The screen that has been generated by the screen generation unit 29 is output to a display such as the output unit 22.

The transmission/reception unit 30 is a communication interface for transmitting and receiving information needed for the respective processes executed in the present embodiment, and execution programs for realizing an operation process creating process (for example, an operation process creating program). Furthermore, the transmission/reception unit 30 sends a screen generated by the screen generation unit 29 to an external device such as the management server 12.

The control unit 31 controls all configurations of the PC 11. For example, the control unit 31 controls at least one of the processes of extracting relevance information, extracting logging information, extracting candidates, displaying candidates, managing data, generating a screen, and transmission/reception.

Note that in the present embodiment, for example, the logging information extraction unit 25, the relevance information extraction unit 24, the candidate extraction unit 26, and the candidate display unit 27 may be provided as a single data processing unit.

PC 11: Hardware Configuration Example

Figure 3:
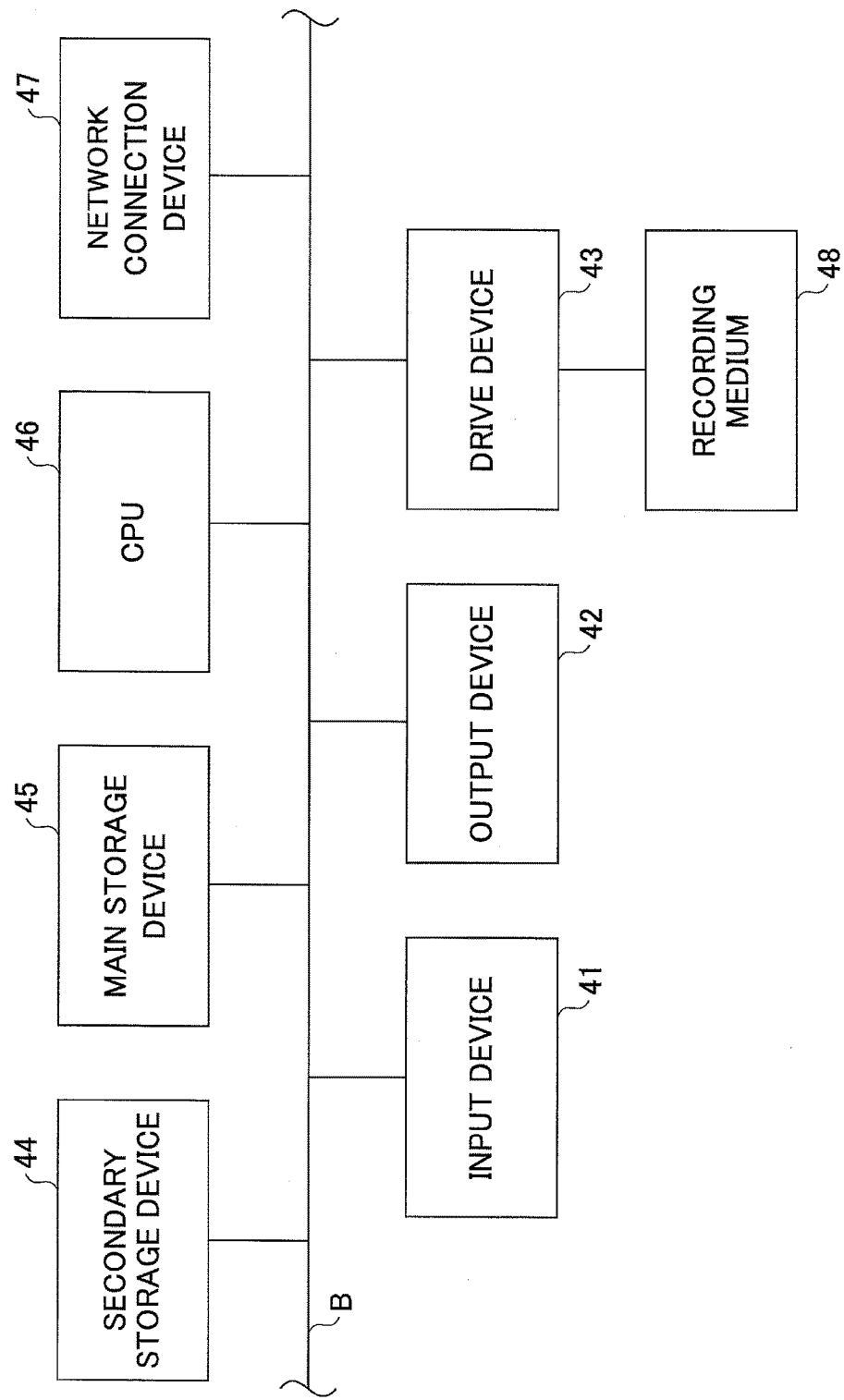
FIG. 3 illustrates an example of a hardware configuration of the PC.

Next, a description is given of a hardware configuration example of the PC 11 with reference to FIG. 3. FIG. 3 illustrates an example of a hardware configuration of the PC 11. The hardware configuration of the PC 11 illustrated in FIG. 3 includes an input device 41, a output device 42, a drive device 43, a secondary storage device 44, a main storage device 45, a CPU (Central Processing Unit) 46 for implementing various control operations, and a network connection device 47, which are interconnected by a bus B.

The input device 41 includes a keyboard and a pointing device such as a mouse operated by the user of the PC 11, and receives the input of various operation signals from the user such as an instruction to execute a program.

The output device 42 includes a display for displaying various windows and data needed for operating the computer main unit performing the processes according to the present embodiment. For example, the output device 42 displays the progress of execution and results of a control program executed by the CPU 46.

The execution program (operation process creation program) installed in the computer main unit of the PC 11 is provided by, for example, a recording medium 48. The drive device 43 reads various kinds of data such as execution programs recorded in the recording medium 48. That is to say, the recording medium 48 may be set in the drive device 43, and execution programs recorded in the recording medium 48 are installed from the recording medium 48 to the secondary storage device 44 via the drive device 43. Note that the drive device 43 may write data in the recording medium 48 such as the execution results obtained by executing a program, when data may be written in the set recording medium 48.

The secondary storage device 44 is a storage unit such as a hard disk drive and a Solid State Drive (SSD), which stores execution programs and control programs according to the present embodiment, and performs input and output according to need.

The main storage device 45 stores execution programs loaded from the secondary storage device 44 by the CPU 46. Note that the main storage device 45 may be, for example, a Read Only Memory (ROM) or a Random Access Memory (RAM).

The CPU 46 realizes the respective processes for creating an operation process, by controlling the processes of the entire computer, such as various computations and input and output of data between the respective hardware elements, based on control programs such as the Operating System (OS) and execution programs stored in the main storage device 45. Note that various kinds of information needed while executing programs are acquired from the secondary storage device 44 by the CPU 46. Furthermore, the execution results are stored in the secondary storage device 44 by the CPU 46.

The network connection device 47 is a communication interface for making it possible to transmit and receive data, by connecting to the management server 12. Furthermore, the network connection device 47 may connect to the management server 12 to acquire execution programs and various kinds of data and execute programs, and provide, to the management server 12, execution results or the execution program itself corresponding to the present embodiment. Note that in the present embodiment, the management server 12 may connect to the manipulation target server 13 via the network connection device 47, and transmit and receive various kinds of data.

The recording medium 48 is a computer-readable recording medium storing execution programs as described above. The recording medium 48 may be a portable recording medium such as a Universal Serial Bus (USB) memory, CD-ROM, or a DVD disk, or a semiconductor memory such as a flash memory.

Example of Operation Process Creation Process

Figure 4:
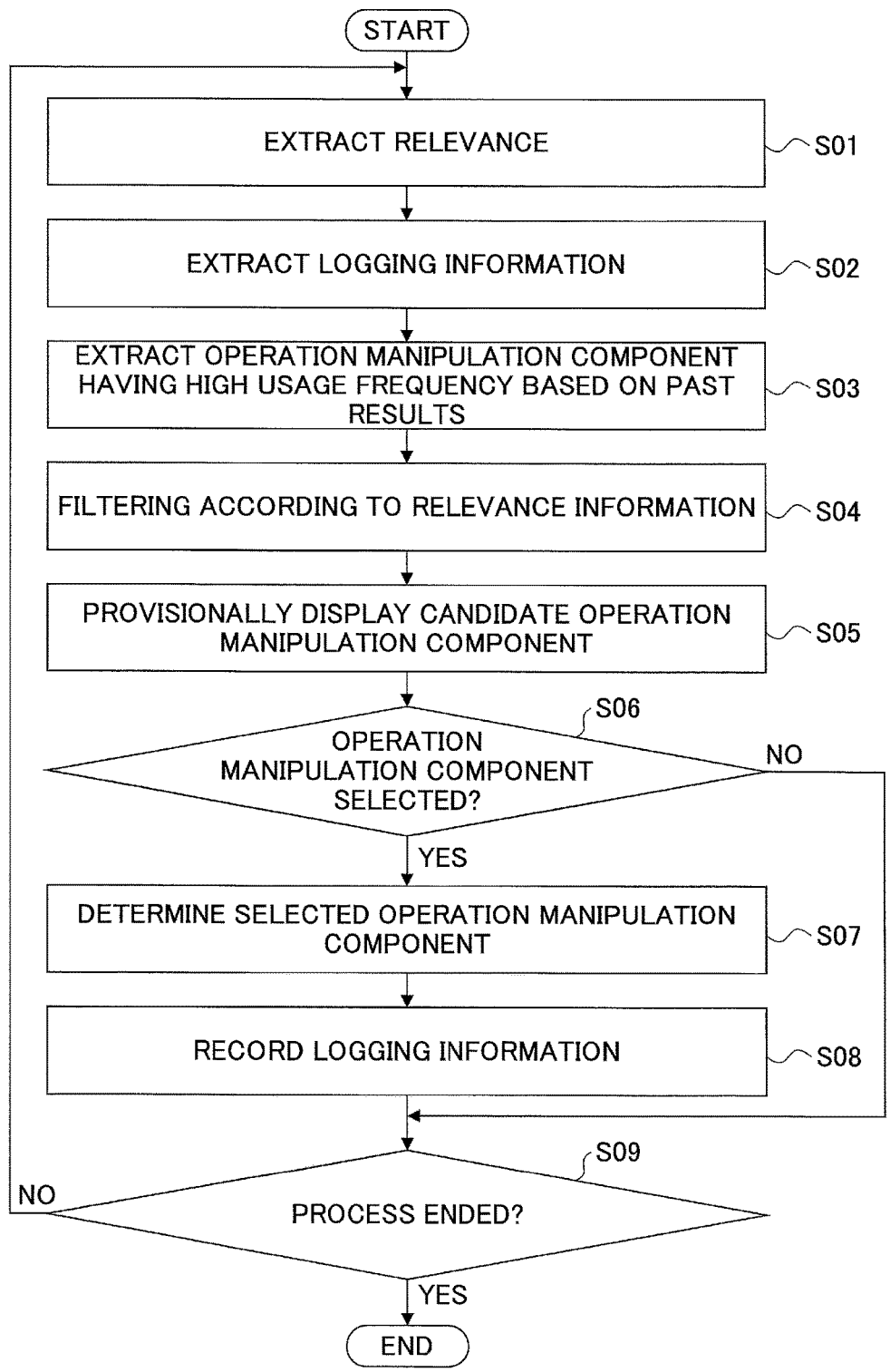
FIG. 4 is a flowchart of an example of an operation process creation process according to an embodiment.

A description is given of an example of an operation process creation process according to the present embodiment, with reference to a flowchart. FIG. 4 is a flowchart of an example of an operation process creation process according to the present embodiment. In the example of FIG. 4, the operation process creation process includes extracting relevance information stored in the storage unit 23 (step S01). Furthermore, the operation process creation process includes extracting logging information or relevant logging information corresponding to the operation process created by the user (operation process creator) or relevant logging information, from the logging information stored in the storage unit 23 (step S02). Note that the process of step S01 and the process of step S02 may be performed in the reversed order.

Next, the operation process creation process includes extracting an operation manipulation component having a high usage frequency, based on the past usage results of the operation manipulation components obtained from the logging information (step S03). Furthermore, the operation process creation process includes filtering the logging information by using the relevance information obtained by the process of step S02 described above (step S04), extracting candidate operation manipulation components, and provisionally displaying the extracted operation manipulation components (step S05).

Next, the operation process creation process includes determining whether the user has selected an operation manipulation component from among the provisionally displayed candidates (step S06). When an operation manipulation component is selected (YES in step S06), the selected operation manipulation component on the screen is determined (step S07). Furthermore, the operation process creation process includes recording the determined operation manipulation component as logging information (step S08).

When the operation manipulation component is not selected by the user in step S06 (NO in step S06), or when the process of step S08 is ended, the operation process creation process includes determining whether to end the entire process (step S09). Specifically, for example, it is determined whether to end the operation process creation process according to whether a key (for example, an escape key) set in advance for ending the operation process creation process has been selected (step S09). Note that in the process of step S09, it is determined whether to end the process, based on whether an operation has been performed on the key (for example, input of the escape key) set in advance for ending the process. When the process is not to be ended (NO in step S09), the operation process creation process returns to the process of step S01, and when the process is to be ended (YES in step S09), the operation process creation process is ended.

Filtering Process (Step S04)

Figure 5:
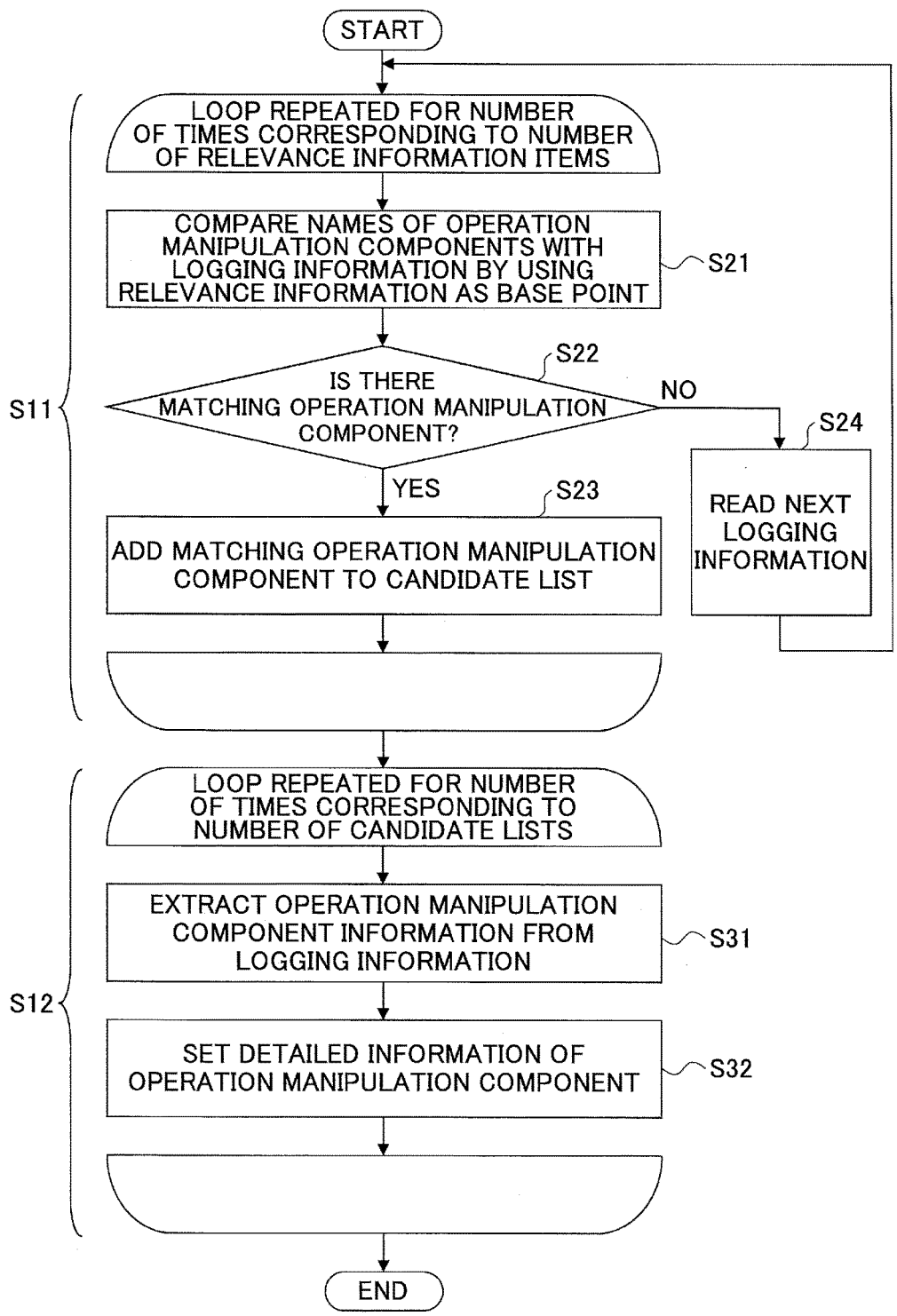
FIG. 5 is a flowchart of an example of a filtering process according to an embodiment.

Next, a specific example of the filtering process of step S04 described above is described with reference to a flowchart. FIG. 5 is a flowchart of an example of a filtering process according to the present embodiment. The filtering process of FIG. 5 includes, for example, the following two loop processes.

First, the filtering process includes repeating, for a number of times corresponding to the number of relevance information items stored in the storage unit 23, a process of comparing the relevance information with the logging information to extract predetermined operation manipulation components, and adding the extracted operation manipulation components to a candidate list (first loop process) (step S11). Next, the filtering process includes repeating, for a number of times corresponding to the number of candidate lists, a process of setting detailed information for the operation manipulation components included in the candidate list obtained by the process of FIG. 11 (second loop process) (step S12).

A detailed description is given of the first loop process described above. The first loop process first includes comparing the names of the operation manipulation components with the logging information by using the relevance information as the base point (step S21), and determining whether there are matching operation manipulation components (step S22). Note that the comparison of names may be, for example, comparing the names displayed on the screen, or identification information other than names for identifying the operation manipulation components. When there is a matching operation manipulation component (YES in step S22), the first loop process includes adding the matching operation manipulation component to the candidate list (step S23). Furthermore, when there is no matching operation manipulation component (NO in step S22), the first loop process includes reading the next logging information if any (step S24), and returning to the process of step S21. The first loop process is repeated for a number of times corresponding to the number of relevance information items.

Next, a detailed description is given of the second loop process described above. The second loop process first includes extracting operation manipulation component information from the logging information (step S31), and next, setting detailed information of the operation manipulation component (step S32). Note that setting detailed information means, for example, applying the priority level; however, the present embodiment is not so limited. The second loop process is repeated for a number of times corresponding to the number of candidate lists.

Display Screen Example According to Present Embodiment

Figure 6:
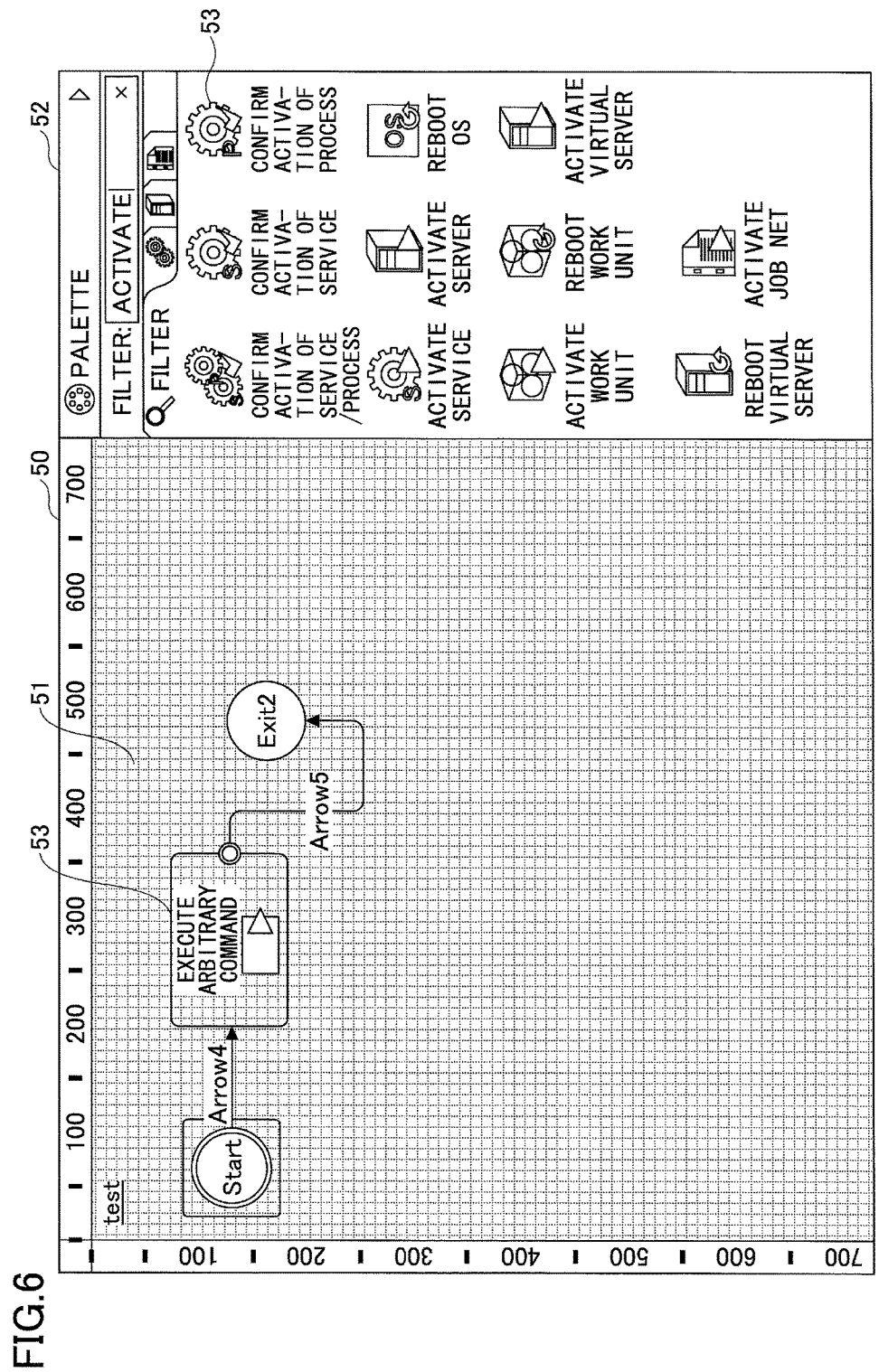
FIG. 6 illustrates a specific example of creating an operation process according to an embodiment.

A specific example of creating an operation process according to the present embodiment is described. FIG. 6 illustrates a specific example of creating an operation process according to the present embodiment. In the example of FIG. 6, an operation process creation screen 50 includes a layout setting area 51 and a palette display area 52. Note that the operation process creation screen 50 indicates a development environment as an operation process creation editor (tool), and is displayed on, for example, the screen of the PC 11.

Figure 7A:
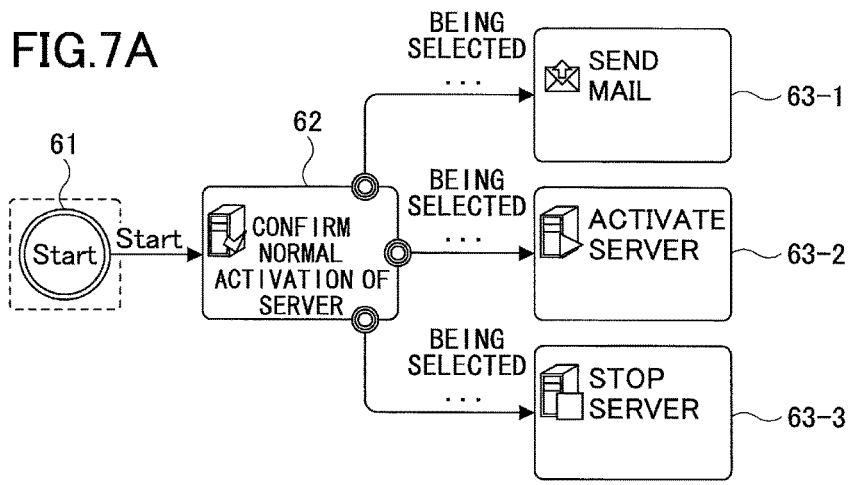
FIGS. 7A through 7C illustrate display examples of candidates of operation manipulation components according to an embodiment.
Figure 7B:
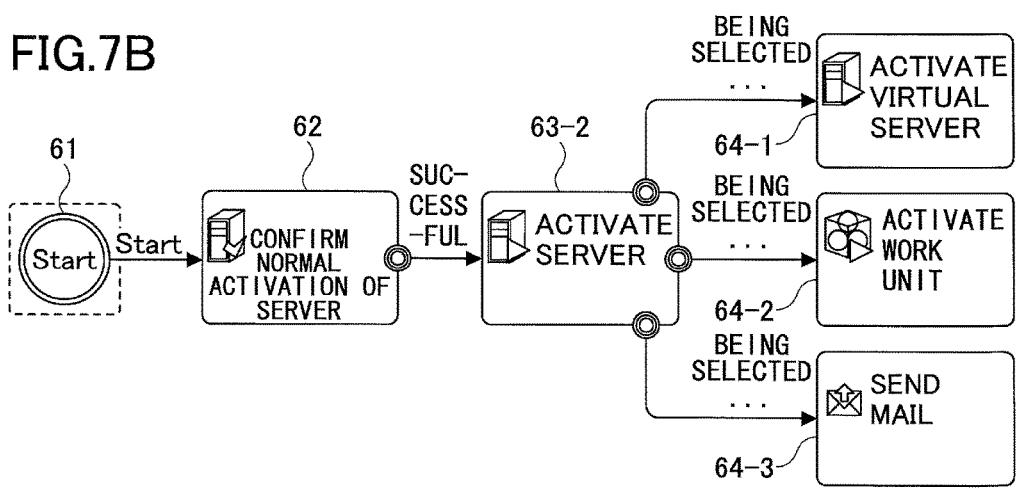
Figure 7C:
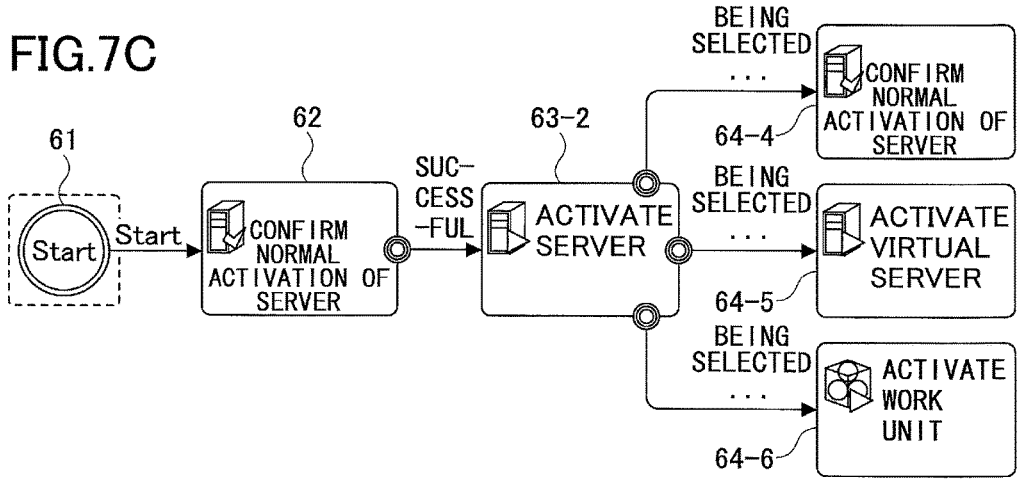

The layout setting area 51 displays settings contents for creating an operation process, such as the arrangement and the order of operation manipulation components 53, and the combination relationship between the operation manipulation components 53 (for example, arrows). The operation manipulation components illustrated in FIGS. 7A through 7C are, for example, modules for manipulating various targets, and are displayed with the use of character strings and icons on the screen; however, the present embodiment is not so limited. The operation manipulation component may be expressed with the use of a symbol, a pattern, or a mark, or a combination thereof.

Furthermore, the palette display area 52 displays corresponding candidates of the operation manipulation components 53, based on the display conditions specified by the user. For example, as illustrated in the example of FIG. 6, when the display condition is "activate", an operation manipulation component 53 relevant to "activate" is displayed, from among the plurality of operation manipulation components recorded in the storage unit 23. Note that, for example, a palette is present in the editor, and the operation manipulation components based on the display condition are displayed on the palette in an order set in advance. The user selects one operation manipulation component from the operation manipulation components displayed on the palette, and arranges the selected operation manipulation component at a predetermined position in the layout setting area 51, to create the operation process.

Display Example of Candidates of Operation Manipulation Component According to Present Embodiment Next, a description is given of display examples of candidates of an operation manipulation component according to the present embodiment, with reference to FIGS. 7A through 7C. FIGS. 7A through 7C illustrate display examples of candidates of an operation manipulation component according to the present embodiment. Note that the examples of FIGS. 7A through 7C illustrate the contents that are displayed in the layout setting area 51 described above. Furthermore, in the following description, as components displayed in the editor when creating an operation process, the name of the component and a predetermined icon are displayed; however, the present embodiment is not so limited. For example, only a name or only a symbol may suffice.

In the example of FIG. 7A, for example, the first component 61 indicating the start of the operation process is arranged. Next, an operation manipulation component 62 indicating "confirm normal activation of server", which is selected by the user from the palette display area 52, is arranged. Then, the component 61 and the operation manipulation component 62 are combined.

In the present embodiment, the next candidate of the operation manipulation component corresponding to the operation manipulation component 62 indicating "confirm normal activation of server" which has been determined, is extracted from the logging information and the relevance information stored in the storage unit 23 as described above. Furthermore, in the present embodiment, the operation manipulation components included in the list of extracted candidates are temporarily provisionally displayed, based on the priority order, as a predetermined number (type) of operation manipulation components 63. Specifically, as illustrated in the example of FIG. 7A, three candidates are provisionally displayed, namely an operation manipulation component 63-1 indicating "send mail", an operation manipulation component 63-2 indicating "activate server", and an operation manipulation component 63-3 indicating "stop server. Note that in the example of FIG. 7A, the operation manipulation components are displayed in an ascending order of priority level with the component of the highest priority appearing at the top; however, the present embodiment is not so limited. The positions where the components are displayed on the screen may be set based on the priority level, or the priority levels may be displayed on the screen.

Furthermore, in the example of FIG. 7A, in order to clarify that three operation manipulation components 63-1 through 63-3 which are candidates are provisionally displayed, for example, a message indicating "being selected . . . " is displayed around the lines combining the operation manipulation component 62 and the operation manipulation components 63-1 through 63-3. Accordingly, the user is able to easily recognize that the next candidates of the operation manipulation component are provisionally being displayed on the screen. Note that the means for conveying to the user that the candidates are provisionally displayed is not limited to the above; for example, the color and shape of the operation manipulation components 63 may be different from those of the operation manipulation component 62 that has already been determined to be arranged.

In the present embodiment, when the user selects an operation manipulation component corresponding to the target operation from among the candidates provisionally displayed in FIG. 7A, only the selected operation manipulation component is displayed, and the other provisionally displayed operation manipulation components are erased. Note that the operation manipulation component may be selected by the user by, for example, moving a cursor on the screen with the input unit 21 such as a mouse, on the operation manipulation component that is the selection target, and clicking the mouse at this position to select the operation manipulation component.

Furthermore, in the example of FIG. 7A, three operation manipulation components 63-1 through 63-3 are displayed; however, the number of displayed candidates is not so limited. For example, the number of displayed candidates is set according to the screen size or the size of the layout setting area 51, the number of extracted candidates, and the level of priority. That is to say, when the screen size and the size of the layout setting area 51 are large, about five candidates may be provisionally displayed. Furthermore, when the number of extracted candidates is only two, only two candidates are provisionally displayed. Furthermore, when the priority level of a component is lower than a predetermined value, the component may be prevented from being needlessly displayed. Note that in the present embodiment, about three candidates are preferably provisionally displayed, in terms of the ease of selection by the user.

Next, in the present embodiment, when the operation manipulation component 63-2 indicating "activate server" is selected from the three options illustrated in FIG. 7A, as illustrated in FIG. 7B, operation manipulation components 64 that are to be the candidates subsequent to "activate server" are provisionally displayed. Specifically, in the example of FIG. 7B, an operation manipulation component 64-1 indicating "activate virtual server 1", an operation manipulation component 64-2 indicating "activate work unit 1", and an operation manipulation component 64-3 indicating "send mail", are provisionally displayed.

Note that in the present embodiment, when the information associated with "activate server" has been changed according to changes in the operation made by the manipulation target server 13, for example, the operation manipulation components that are provisionally displayed based on the logging information, may be constantly changed. For example, when the frequency of using the operation manipulation component "confirm normal activation of server" after the operation manipulation component 63-2 indicating "activate server" increases, the priority level is also increased. Therefore, in the present embodiment, as illustrated in the example of FIG. 7C, the contents of the operation manipulation components 64 are changed and displayed. Specifically, in the example of FIG. 7C, an operation manipulation component 64-4 indicating "confirm normal activation of server", an operation manipulation component 64-5 indicating "activate virtual server", and an operation manipulation component 64-6 indicating "activate work unit", are provisionally displayed.

Display Examples of Candidates of Plural Places Ahead

In the above example, the candidates of operation manipulation components, which come next to the operation manipulation component at the end of the operation process being created, are displayed; however, the present embodiment is not so limited. For example, candidates of a plurality of places ahead may be displayed, such that the user may select subsequent processes of a plurality of places ahead, at once. FIG. 8 illustrates a display example of candidates of a plurality of places ahead.

In the present embodiment, as illustrated in FIG. 8, with respect to an operation manipulation component 72 indicating "confirm normal activation of server" which has been determined and which has been combined with a component 71 indicating "start", the operation manipulation components to be displayed as next candidates may be displayed by predicting a plurality of places ahead. In the example of FIG. 8, as subsequent operation manipulation components, operation manipulation components 73-1, 73-2 to be combined with the determined operation manipulation component 72, and operation manipulation components 74-1 through 74-5 to be combined with the operation manipulation components 73-1, 73-2, are provisionally displayed.

Accordingly, in the present embodiment, it is possible to confirm operation manipulation components of a plurality of places ahead at an early stage, and therefore the user is able to surely select the desired operation manipulation components. Note that the number of predicated candidates of a plurality of places ahead is not particularly limited, and may be set arbitrarily.

Furthermore, in the example of FIG. 8, by selecting one component among the operation manipulation components 74-1 through 74-5 displayed at the ends of operation manipulation components at a plurality of places ahead, it is possible to determine a path from the operation manipulation component 72 which has already been determined. Specifically, when a user selects the operation manipulation component 74-2 indicating "confirm activation of process" in FIG. 8 displayed on the screen, it is possible to determine a route from "confirm normal activation of server" to "confirm activation of process", by one click. That is to say, in the example of FIG. 8, by selecting one component, it is possible to select a plurality of operation manipulation components.

Display Example of Newly Added Operation Manipulation Component

Figure 9:
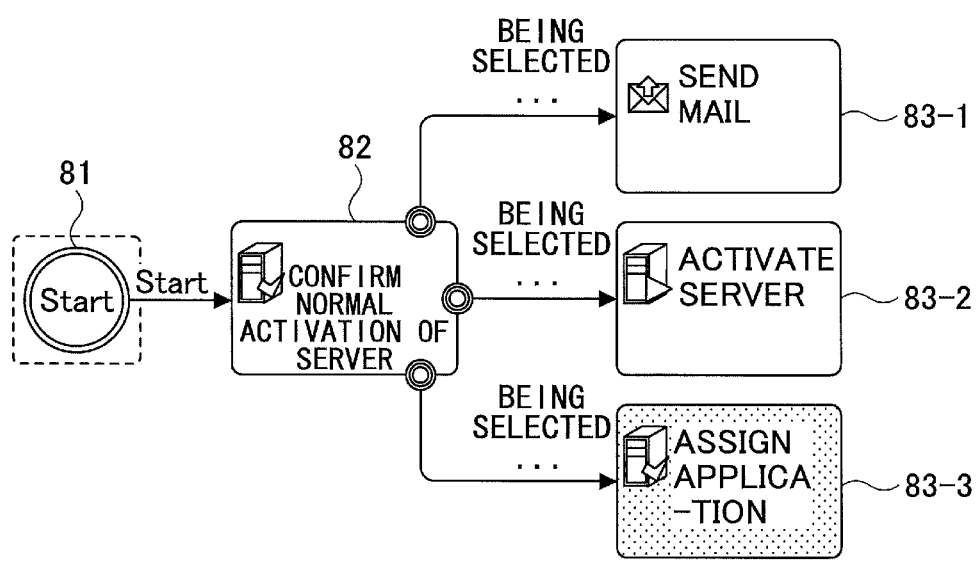
FIG. 9 illustrates a display example of a newly added operation manipulation component.

Furthermore, in the present embodiment, in order for the user to easily recognize a newly added operation manipulation component, the newly added operation manipulation component may be displayed in a different manner from the other operation manipulation components that are displayed on the screen. FIG. 9 illustrates a display example of a newly added operation manipulation component. In the example of FIG. 9, with respect to an operation manipulation component 82 indicating "confirm normal activation of server" which has been determined and which has been combined with a component 81 indicating "start", three operation manipulation components 83-1 through 83-3 are displayed as the next candidates.

The priority levels in the present embodiment are applied according to, for example, past usage frequencies, and the components are displayed in an ascending order with the component of the highest priority level displayed at the top. However, a newly added operation manipulation component has a low usage frequency since it is new, and is thus unlikely to be displayed as a candidate. Therefore, in the present embodiment, an newly added component is set to have a high priority level even though the usage frequency is low, such that the newly added component is likely to be provisionally displayed.

Note that the newly added operation manipulation component is preferably displayed in a manner as to be distinguishable from other operation manipulation components. For example, in the example of FIG. 9, among the operation manipulation components 83-1 through 83-3 that are provisionally displayed, the operation manipulation component indicating "assign application" is the newly added operation manipulation component. In this case, this newly added operation manipulation component is displayed in a different color from that of the other operation manipulation components. Note that the manner of displaying a new component is not limited to the above; for example, with respect to the display of the operation manipulation component 83-3 indicating "assign application", characters such as "NEW" may be applied, or a pattern may be applied.

Furthermore, a newly added operation manipulation component includes, for example, an operation manipulation component that has been added within a predetermined time period set in advance (for example, one week); however, the present embodiment is not so limited.

Figure 10:
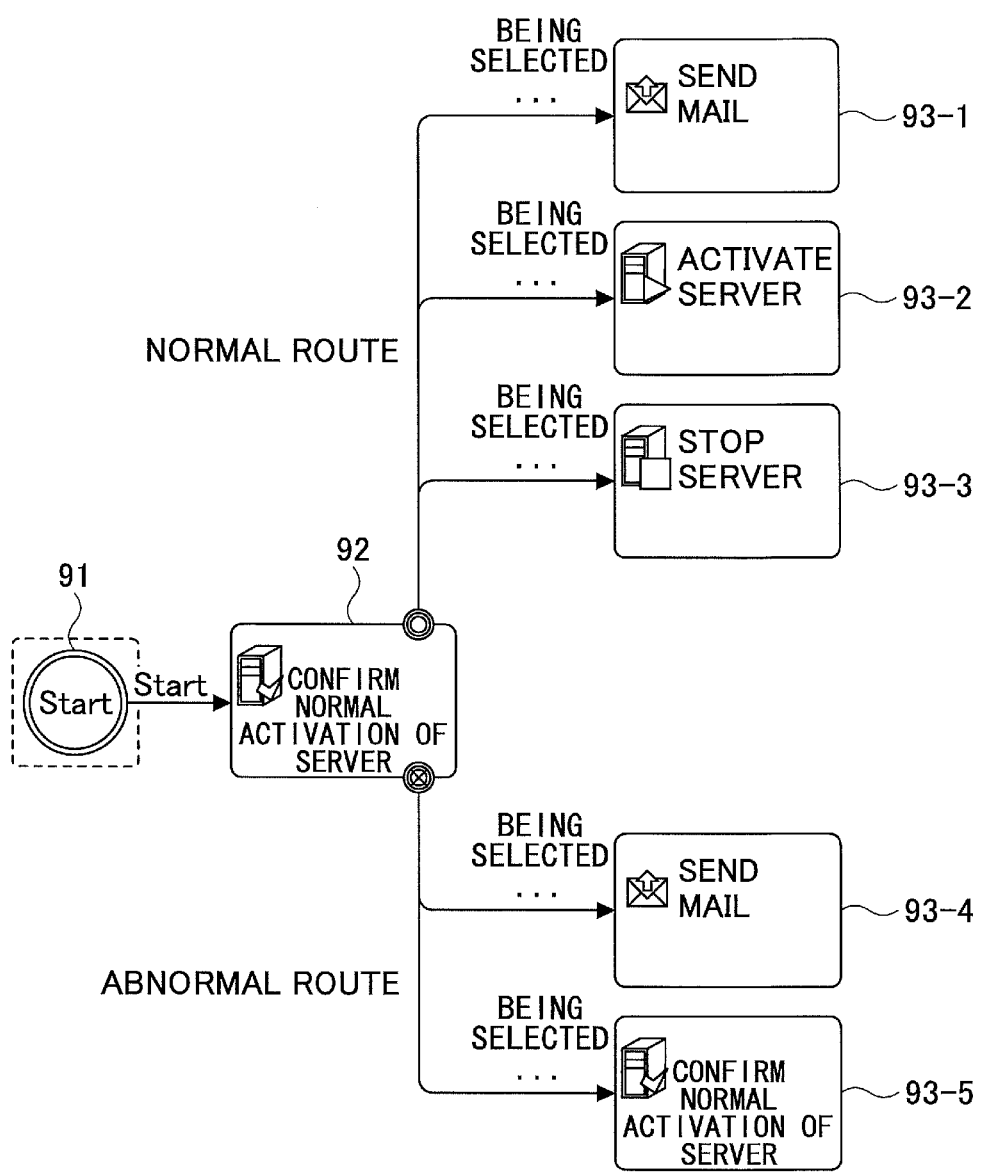
FIG. 10 illustrates a display example of candidates with respect to an operation manipulation component for which branch routes may be set.

Display Example of Candidate with Respect to Operation Manipulation Component for which Branch Routes May be Set Furthermore, in the present embodiment, there are operation manipulation components for which a plurality of branch routes may be set for a single operation manipulation component. In this case, in the present embodiment, it is possible to display candidates of operation manipulation components corresponding to the respective routes. FIG. 10 illustrates a display example of candidates with respect to an operation manipulation component for which branch routes may be set.

As illustrated in FIG. 10, with respect to an operation manipulation component 92 indicating "confirm normal activation of server" which has been determined and which has been combined with a component 91 indicating "start", it is assumed that two routes of "normal route" and "abnormal route" may be set. Note that information indicating whether the branching of the route is possible, is stored in advance in the storage unit 23. When a plurality of branch routes may be set for the operation manipulation component 92, the next candidate operation manipulation components 93-1 through 94-5 are displayed for the routes that may be set.

Specifically, with respect to the determined operation manipulation component 92 illustrated in FIG. 10, as next candidates in the "normal route", operation manipulation components 93-1 through 93-3 are displayed, and as next candidates in the "abnormal route", operation manipulation components 93-4, 93-5 are displayed. Therefore, in the display of FIG. 10, by selecting one operation manipulation component in the "normal route" and one operation manipulation component in the "abnormal route", the user is able to determine the operation manipulations of the respective routes.

Note that when there is no operation manipulation that the user desires among the operation manipulation components displayed as candidates as described above, the user may select an operation manipulation component from those displayed in the palette display area 52. Furthermore, the various screen displays described above are displayed by the above candidate display unit 27, and output by the output unit 22. Furthermore, for example, as in the palette display area 52 described above, the display contents other than the candidates may be displayed by the screen generation unit 29.

Example of Relevance Information

Next, a description is given of a specific example of relevance information according to the present embodiment. FIGS. 11 and 12 illustrate examples of items in relevance information according to the present embodiment (part 1, part 2). FIG. 13 illustrates an example of data of relevance information according to the present embodiment.

In FIGS. 11 and 12, items of the relevance information stored in the storage unit 23 include, for example, "Element Name", "Parent Element", "Element Description", "Component Name", "Component Type", "Component Description", and "Data Type". Note that the types and order of the items in the relevance information are not limited to the above.

The relevance information according to the present embodiment includes, for example, as illustrated in FIG. 11, information of an operation manipulation component, a server manipulation component, and a command execution component. Note that the server manipulation component and the command execution component described above are included in the operation manipulation component according to the present embodiment. Furthermore, the relevance information according to the present embodiment includes, for example, as illustrated in FIG. 12, information of a relevant operation manipulation component relevant to [activate server], a relevant operation manipulation component relevant to [stop server], and a relevant operation manipulation component relevant to [execute arbitrary command].

Furthermore, the data of the relevance information described above may be saved in, for example, an Extensible Markup Language (XML) document format; however, the present embodiment is not so limited. Specifically, the data is in a format as illustrated in FIG. 13. Note that on the left side of FIG. 13, line numbers are indicated as a matter of convenience for description. In FIG. 13, for example, in the (06)th line, a component relevant to confirming the normal activation of the server is stored ("StartServer, StopServer, SendMail"). Furthermore, in the (07)th line, a component relevant to the activation of the server is stored, and in the (08)th line, a component relevant to the stopping of the server is set. Furthermore, in the (13)th line, a component relevant to executing a single command is set, and in the (06)th line, a component relevant to executing a plurality of commands is set.

In the present embodiment, among the above relevance information items, the relevance information corresponding to the operation process to be created is extracted, and the extracted relevance information and the logging information is used to extract the candidates.

Specific Example of Logging Information

Next, a description is given of a specific example of logging information according to the present embodiment. FIGS. 14 and 15 illustrate examples of items in logging information according to the present embodiment (part 1, part 2). In FIG. 14, examples of logging information stored in the storage unit 23 include, for example, "Element Name", "Parent Element", "Element Description", "Component Name", "Component Type", "Component Description", and "Data Type". Note that the types and order of the items in the logging information are not limited to the above.

As illustrated in FIGS. 14 and 15, the logging information according to the present embodiment includes, as contents of the "Element Description", for example, information of definition information, a server manipulation component, and a command execution component. Furthermore, the logging information according to the present embodiment includes, for example, information of a detailed definition of [activate server], a detailed definition of [stop server], a detailed definition of [execute arbitrary command], and detailed definition of [execute a plurality of commands]. Furthermore, the data of the logging information in FIGS. 14 and 15 described above may be saved in, for example, an Extensible Markup Language (XML) document format; however, the present embodiment is not so limited.

A description is given of a specific example of logging information obtained according to the present embodiment. Note that as an example of the logging information, a description is given of a recording example of logging information corresponding to the operation process creation state illustrated in FIG. 7A (select "confirm normal activation of server" to "activate server").

FIGS. 16A and 16B illustrate specific examples of logging information according to the present embodiment. Note that on the left side of FIGS. 16A and 16B, line numbers are indicated as a matter of convenience for description. FIG. 16A illustrates an example of logging information of an operation manipulation component of "confirm normal activation of server", and FIG. 16B illustrates an example of logging information of an operation manipulation component of "activate server".

In FIG. 16A, in the logging information of an operation manipulation component of "confirm normal activation of server", for example, in the tag of <CheckServerDefinition> on the (06)th, (07)th lines, "activation confirmation date (Setting Date)", "host name (hostname)", "activation contents (service)", "port number (port)", "OS type (ostype)", user name (username)", and "password (password)" are set.

Furthermore, in FIG. 16B, in the logging information of an operation manipulation component of "activate server", for example, in the tag of <StartServerDefinition> on the (06)th, (07)th lines, "activation confirmation date (Setting Date)", "host name (hostname)", "activation contents (service)", "port number (port)", "OS type (ostype)", user name (username)", and "password (password)" are set.

Application of Priority Level of Operation Manipulation Components

In the present embodiment, the operation manipulation components are displayed on the screen based on predetermined priority levels set in advance for a plurality of operation manipulation components that are candidates. Specifically, in the present embodiment, for example, the number of records of the logging information is calculated, and the priority rank orders are determined from the number that has actually been defined. FIGS. 17 through 19 illustrate examples of logging information to which the priority levels are applied (part 1 through part 3). Note that on the left side of FIGS. 17 through 19, line numbers are indicated as a matter of convenience for description.

Furthermore, in the logging information in FIGS. 17 through 19, a series of logging information items are applied, which are sequentially recorded in the operation process creation process. The application of priority levels in the present embodiment may be set by using, for example, logging information. For example, FIGS. 17 through 19 illustrate an example of logging information in which "confirm normal activation of server" is set once ((01)th line through (11)th line), "activate server" is set twice ((12)th line through (33)th line), and "send mail" is set three times ((34)th line through (66)th line).

That is to say, in the present embodiment, when there is the logging information in FIGS. 17 through 19 as the past history of creating operation processes, the priority levels based on a condition set in advance (for example, the usage frequency"), are "send mail">"activate server">"confirm normal activation of server".

Example of Extracting Subsequent Candidates from Past History of Creating Operation Process In the present embodiment, when displaying the candidates of an operation manipulation component, for example, priority levels are applied to the logging information at the time of creating an operation process in the past, and candidates of a subsequent operation manipulation component are extracted according to the applied priority levels. Note that the priority levels are applied with the use of at least one of the usage frequency of the operation manipulation components, the earlier-later relationship between operation manipulation components, and the set (combination) of a plurality of operation manipulation components.

When the priority levels are applied according to the usage frequency of the operation manipulation components, for example, an operation manipulation component having a high usage frequency in the past is given a priority level so as to be preferentially displayed on the screen. Furthermore, when the priority levels are applied according to the earlier-later relationship between operation manipulation components, for example, an operation manipulation component that is highly likely to be arranged subsequently to an operation manipulation component that is already determined to be arranged, is extracted from the logging information. Next, the operation manipulation component that is highly likely to be arranged is given a priority level so as to be preferentially displayed on the screen. Note that the earlier-later relationship of the operation manipulation components is obtained, by referring to the relevance information described above, so that it is possible to extract an even more appropriate operation manipulation component.

Furthermore, when the priority levels are applied according to the set (combination) of a plurality of operation manipulation components, for example, a set (combination) of operation manipulation components which are used at the same time is created, based on the past history of creating an operation process. Then, the operation manipulation component included in the set to which operation manipulation component that is already determined to be arranged belongs, is given a priority level so as to be preferentially displayed on the screen. Note that the priority level may be expressed by a value or a symbol; however, the present embodiment is not so limited.

As described above, according to the present embodiment, it is possible to create an appropriate operation process by an even more simple manipulation, and therefore the cost of creating an operation process is significantly reduced. Specifically, in the present embodiment, an operation manipulation component set at the time of creating an operation process may be automatically predicted, the next candidates may be displayed on the screen, and the user may select, by one click, an appropriate manipulation component from among the displayed operation manipulation components.

Furthermore, as the operation manipulation components to be displayed as candidates, operation manipulation components to which the relevance is also added in addition to past logging information, may be provisionally displayed. Accordingly, candidates may be displayed with even higher precision.

Furthermore, according to the present embodiment, all of the selected operation manipulation components and setting information are subjected to logging according to a database, and used as input information for applying priority levels when making settings from the next time and onward. Furthermore, candidates of the operation manipulation components may be displayed for a plurality of places ahead, and simply by selecting the operation manipulation component at the end, it is possible to determine the definition including the path up to the selected operation manipulation component. Furthermore, a newly added operation manipulation component may be displayed as a candidate, regardless of the past usage frequency. Furthermore, when branched routes such as a normal route and an abnormal route need to be provided for an operation manipulation component, candidates may be displayed for the respective routes.

Therefore, in the above embodiment, it is possible to select, by simple manipulation, an appropriate component from among the operation manipulation components that are displayed by the above display formats, and therefore the time and cost for creating an operation process may be significantly reduced. Specifically, an operation process, which has been manually defined step by step, may be defined by a simple manipulation of one click, and therefore the development time period for creating an operation process is significantly reduced. Furthermore, in the present embodiment, the relevance of the operation manipulation components and the logging information are combined, and therefore, not only is it possible to merely provisionally display a candidate having a high usage frequency, but it is also possible to provisionally display a candidate that better fits the business.

Furthermore, in the present embodiment, the relevance of the operation manipulation components and the logging information are permanently subjected to logging, and therefore the operation manipulation components that are provisionally displayed are changed every time a definition is made, and optimum candidates for operation manipulation components are provisionally displaced each time.

Note that the present embodiment is applicable to the field of, for example, smart technology. Smart technology is, for example, a technology for determining the status of hardware and software by oneself, and making optimizations for realizing simple and safe usage.

Furthermore, by recording a program for implementing the operation process creation process described in the above embodiment in a recording medium, the operation process creation process according to the present embodiment may be executed by a computer.

According to an aspect of the embodiments, the costs of creating an operation process are reduced.

The present invention is not limited to the specific embodiments described herein, and variations and modifications may be made without departing from the scope of the present invention. Furthermore, all of or some of the elements in the above embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute an operation process creation process comprising:

extracting, in response to detecting an arranged operation manipulation component that is arranged on a screen of a display device, a first candidate operation manipulation component to be combined with and follow the arranged operation manipulation component and a second candidate operation manipulation component to be combined with and follow the first candidate operation manipulation component, based on previously set relevance information and usage frequency information that are stored in a storage device, wherein the previously set relevance information indicates a relevance between a plurality of operation manipulation components, and wherein the usage frequency information indicates usage frequencies of the plurality of operation manipulation components in past instances of creating the plurality of operation processes; and displaying, on the screen of the display device, the first candidate operation manipulation component by combining the first candidate operation manipulation component with and follow the arranged operation manipulation component, and the second candidate operation manipulation component by combining the second candidate operation manipulation component with and follow the first candidate operation manipulation component, to create an operation process including the arranged operation manipulation component, the first candidate operation manipulation component, and the second candidate operation manipulation component, wherein the extracting extracts a predetermined number of candidate operation manipulation components including the first and second candidate operation manipulation components;

displaying, on the screen of the display device, the predetermined number of candidate operation manipulation components that are arranged in a predetermined order, based on priority levels previously set for the predetermined number of candidate operation manipulation components and stored in the storage device, after the extracting extracts the predetermined number of candidate operation manipulation components; and setting the priority levels for the predetermined number of candidate operation manipulation components by using at least one of a usage frequency of the predetermined number of operation manipulation components, an earlier-later relationship between the predetermined number of operation manipulation components, and combinations of the predetermined number of operation manipulation components that are stored in the storage device.

2. The non-transitory computer-readable recording medium according to claim 1, wherein the operation process creation process further comprises:

displaying, on the screen of the display device, a candidate corresponding to a newly added operation manipulation component among the plurality of candidate operation manipulation components, such that the candidate corresponding to the newly added operation manipulation component is displayed in a different manner from other ones of the plurality of candidate operation manipulation components.

3. The non-transitory computer-readable recording medium according to claim 1, wherein the operation process creation process further comprises:

displaying, on the screen of the display device, the plurality of candidate operation manipulation components for a plurality of routes with respect to the arranged operation manipulation component.

4. An operation process creation method comprising:

extracting, by a processor in response to detecting an arranged operation manipulation component that is arranged on a screen of a display device, a first candidate operation manipulation component to be combined with and follow the arranged operation manipulation component and a second candidate operation manipulation component to be combined with and follow the first candidate operation manipulation component, based on previously set relevance information and usage frequency information that are stored in a storage device, wherein the previously set relevance information indicates a relevance between a plurality of operation manipulation components, and wherein the usage frequency information indicates usage frequencies of the plurality of operation manipulation components in past instances of creating the plurality of operation processes;

displaying, by the processor on the screen of the display device, the first candidate operation manipulation component by combining the first candidate operation manipulation component with and follow the arranged operation manipulation component, and the second candidate operation manipulation component by combining the second candidate operation manipulation component with and follow the first candidate operation manipulation component, to create an operation process including the arranged operation manipulation component, the first candidate operation manipulation component, and the second candidate operation manipulation component, wherein the extracting extracts a predetermined number of candidate operation manipulation components including the first and second candidate operation manipulation components;

displaying, by the processor on the screen of the display device, the predetermined number of candidate operation manipulation components that are arranged in a predetermined order, based on priority levels previously set for the predetermined number of candidate operation manipulation components and stored in the storage device, after the extracting extracts the predetermined number of candidate operation manipulation components; and setting, by the processor, the priority levels for the predetermined number of candidate operation manipulation components by using at least one of a usage frequency of the predetermined number of operation manipulation components, an earlier-later relationship between the predetermined number of operation manipulation components, and combinations of the predetermined number of operation manipulation components that are stored in the storage device.

5. The operation process creation method according to claim 4, further comprising:

displaying, by the processor on the screen of the display device, a candidate corresponding to a newly added operation manipulation component among the plurality of candidate operation manipulation components, such that the candidate corresponding to the newly added operation manipulation component is displayed in a different manner from other ones of the plurality of candidate operation manipulation components.

6. The operation process creation method according to claim 4, further comprising:

displaying, by the processor on the screen of the display device, the plurality of candidate operation manipulation components for a plurality of routes with respect to the arranged operation manipulation component.

7. An information processing device comprising:

a storage device configured to store previously set relevance information indicating a relevance between a plurality of operation manipulation components, and usage frequency information indicating usage frequencies of the plurality of operation manipulation components in past instances of creating the plurality of operation processes; and a processor configured to execute a program to perform an operation process creation process including extracting, in response to detecting an arranged operation manipulation component that is arranged on a screen of a display device, a first candidate operation manipulation component to be combined with and follow the arranged operation manipulation component and a second candidate operation manipulation component to be combined with and follow the first candidate operation manipulation component, based on the previously set relevance information and the usage frequency information that are stored in the storage device; and displaying, on the screen of the display device, the first candidate operation manipulation component, by combining the first candidate operation manipulation component with and follow the arranged operation manipulation component and the second candidate operation manipulation component by combining the second candidate operation manipulation component with and follow the first candidate operation manipulation component, to create an operation process including the arranged operation manipulation component, the first candidate operation manipulation component, and the second candidate operation manipulation component, wherein the extracting extracts a predetermined number of candidate operation manipulation components including the first and second candidate operation manipulation components;

displaying, on the screen of the display device, the predetermined number of candidate operation manipulation components that are arranged in a predetermined order, based on priority levels previously set for the predetermined number of candidate operation manipulation components and stored in the storage device, after the extracting extracts the predetermined number of candidate operation manipulation components, and setting the priority levels for the predetermined number of candidate operation manipulation components by using at least one of a usage frequency of the predetermined number of operation manipulation components, an earlier-later relationship between the predetermined number of operation manipulation components, and combinations of the predetermined number of operation manipulation components that are stored in the storage device.

8. The information processing device according to claim 7, wherein the operation process creation process further includes displaying, on the screen of the display device, a candidate corresponding to a newly added operation manipulation component among the plurality of candidate operation manipulation components, such that the candidate corresponding to the newly added operation manipulation component is displayed in a different manner from other ones of the plurality of candidate operation manipulation components.

9. The information processing device according to claim 7, wherein the operation process creation process further includes displaying, on the screen of the display device, the plurality of candidate operation manipulation components for a plurality of routes with respect to the arranged operation manipulation component.

* * * * *